(12) United States Patent
Krier et al.

(10) Patent No.: US 6,725,972 B1
(45) Date of Patent: Apr. 27, 2004

(54) CIRCULAR TREE STAND

(76) Inventors: Samuel Glen Krier, 2419 Newport, Oskaloosa, IA (US) 52577; Jeffrey Alan Krier, 18327 249th St., Sigourney, IA (US) 52591

( * ) Notice: Subject to any disclaimer, the term of this patent is extended or adjusted under 35 U.S.C. 154(b) by 0 days.

(21) Appl. No.: 10/272,258

(22) Filed: Oct. 16, 2002

(51) Int. Cl.$^7$ ............................................... A01M 31/02
(52) U.S. Cl. .................. 182/187; 248/218.4; 248/230.5
(58) Field of Search ........................... 182/187, 116, 182/117, 118, 119, 115, 188; 248/218.4, 219.3, 230.5, 523, 524, 527, 230.3, 231.41, 219.4, 230.6, 231.61, 216.1, 216.4, 230.2, 230.9, 231.85, 219.1

(56) References Cited

U.S. PATENT DOCUMENTS

| | | | | |
|---|---|---|---|---|
| 1,962,255 A | * | 6/1934 | Neidinger | 248/147 |
| 2,908,469 A | * | 10/1959 | Mack et al. | 248/230.5 |
| 3,003,646 A | * | 10/1961 | Wolf | 211/107 |
| 3,336,999 A | * | 8/1967 | McSwain | 182/20 |
| 4,056,902 A | * | 11/1977 | Ziegler, Jr. | 52/73 |
| 4,513,923 A | * | 4/1985 | Ulics | 242/598.5 |
| 4,784,239 A | * | 11/1988 | Kirkman | 182/187 |
| 5,522,186 A | * | 6/1996 | Jarman | 52/73 |
| 5,853,066 A | * | 12/1998 | Gohn | 182/20 |
| 5,938,168 A | * | 8/1999 | Adams | 248/523 |
| 6,345,690 B1 | * | 2/2002 | Morris | 182/136 |

FOREIGN PATENT DOCUMENTS

| | | | | |
|---|---|---|---|---|
| CH | 598469 A | * | 4/1978 | |
| DE | 465292 | * | 9/1928 | 182/187 |

\* cited by examiner

*Primary Examiner*—Leslie A. Braun
*Assistant Examiner*—Jon Szumny

(57) ABSTRACT

A circular tree stand allows a hunter or wildlife enthusiast to shoot or photograph approaching wildlife. The stand is comprised of a circular deck and a separate circular seat of lesser dimensions. The larger platform is positioned directly below the smaller seat structure. The deck and seat structure allow the user to move a full 360 degrees allowing the user to set up facing approaching wildlife regardless of the side of the tree that the wildlife approaches from. The structure also allows an open space between the human in the stand and the ground. The ladder system allows the stand to be quickly and efficiently mounted without additional hardware or tools.

2 Claims, 3 Drawing Sheets

CIRCULAR TREE STAND

BACKGROUND OF THE INVENTION

1. Field of the Invention

The present invention relates generally to tree stands that hold humans for recreational purposes. More specifically the invention relates to a circular tree stand.

2. Description of Related Art

Hunters and photographers have used tree stands to pursue wildlife for recreational purposes for many years. The stand set up allows access to nature in an undisturbed environment and has been very successful in this endeavor.

The downside to using tree stands as they are presently equipped is that they restrict movement and view to one side of the tree. There is a need for a 360 degree circular tree stand that allows the user to situate their person on any side of the tree. This creates an unfettered view and angle on approaching wildlife. The present invention provides such a devise that is also easily mounted onto a tree.

Past inventions include some devices with rotating seats but not structures that completely encircle a tree and allow the user to set up on any side of the tree and have completely clear and unblocked access from the stand to the ground from one stand without moving the stand.

The instant invention as claimed is not described above.

SUMMARY OF THE INVENTION

The invention relates to a circular tree stand that allows the hunter or photographer to access unfettered views of approaching wildlife. The tree stand is comprised of two components that create a seat and a platform when attached to a tree.

The platform component of the tree stand consists of two semi-circular halves that are placed on the tree by attaching a ladder to each half, raising each half independently, and resting each half against the trunk of the tree. The halves are then clamped together by four bolts, two on the outside ring and two on the inside ring. The ram action set of teeth is then applied by rotating the T shaped handle clockwise until the teeth on both clamp and the teeth on the inside of the adjacent half mesh onto the tree. Two additional set screws are then tightened until they rest tightly against the tree to provide additional side to side support. The seat structure is then hauled up to the platform by a rope and attached in the same manner allowing the user to sit down with both feet resting securely on the platform.

It is the objective of the invention to provide a tree stand that is portable and provides a stable platform and seat. The whole invention encircles a tree to provide a full 360 degree stand.

DETAILED DESCRIPTION OF THE PREFERRED EMBODIMENT

The invention relates to a circular tree stand that allows the hunter or photographer to access unfettered views of approaching wildlife. The seat structure is circular when mounted. The platform structure is circular when mounted. The ram action set of teeth when applied secure both the seat and platform structure as the ram action set of teeth are identical.

Figure 1:
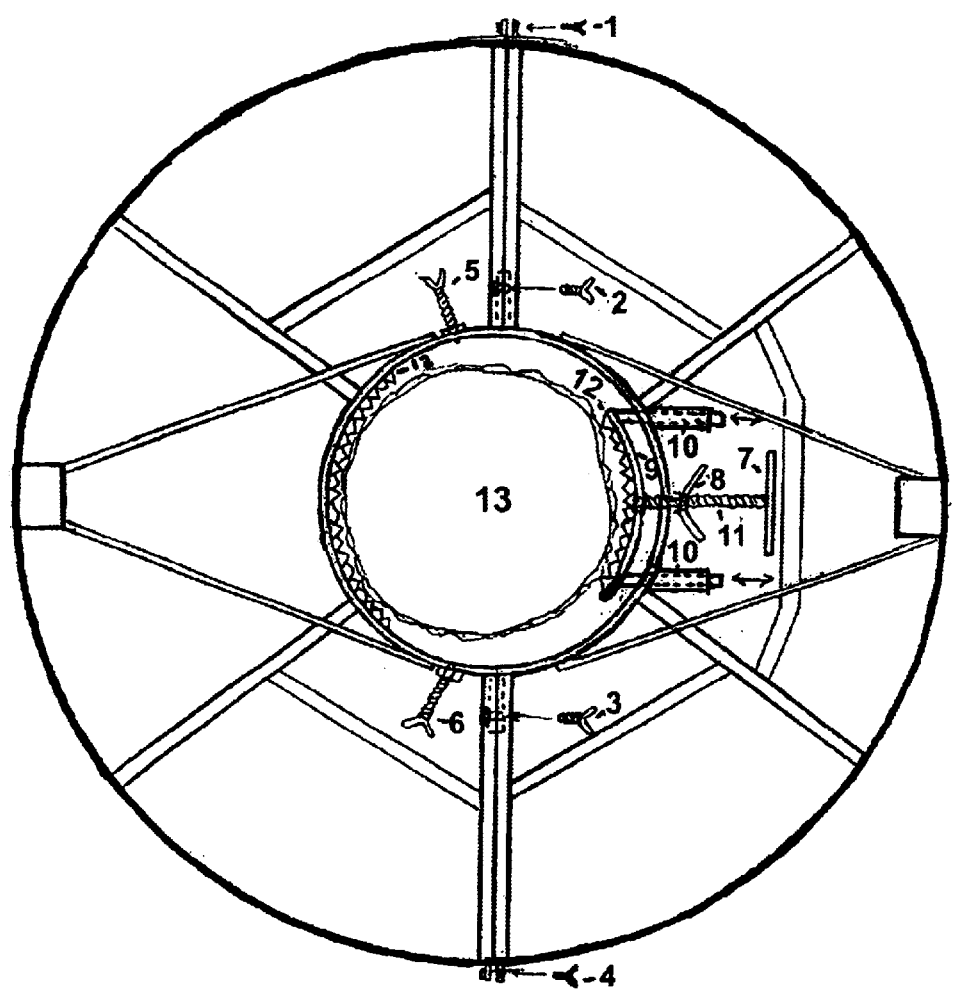
FIG. 1 is a top view as taken from section 1—1 of FIG. 2.

In FIG. 1, the bolts 1,2,3, and 4 are applied to secure the two halves of the platform and the two halves of the seat together around the tree trunk. 7 is then used as a hand crank to turn the bolt stock 11 that transfer the energy to the ram action set of teeth 9,12 until they are firmly secured to the tree trunk 13. 8 is then applied to lock 11. 10 stabilizes the ram action set of teeth and provides the strength needed to make the tree stand safe and functional. 5 and 6 are then applied to 13 as stabilizers to prevent any side to side movement as this is undesirable from a recreational tree stand.

Figure 2:
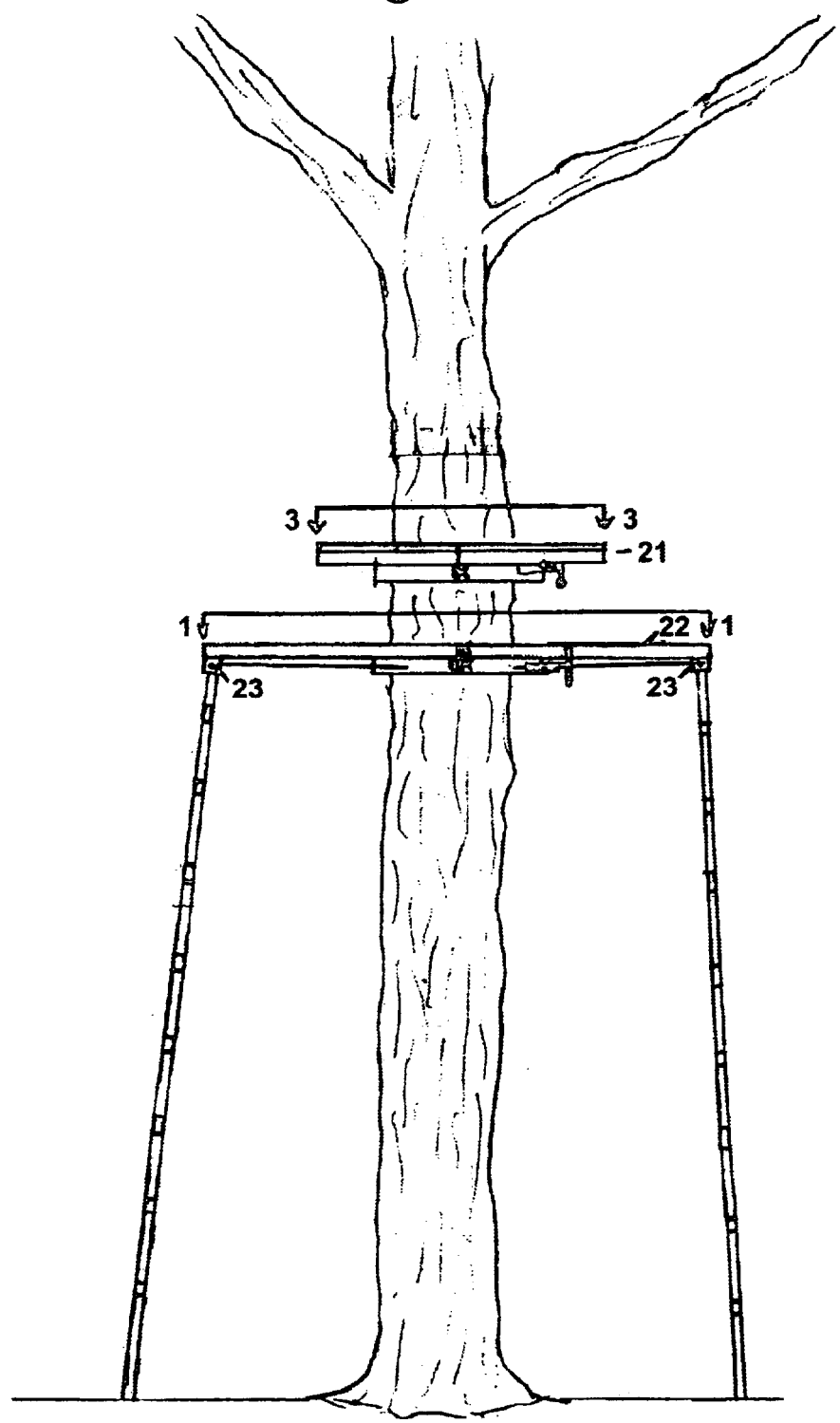
FIG. 2 is a side view of the seat, platform, and ladder set up on a tree.

In FIG. 2, 21 shows the seat part of the tree stand mounted to the tree. 22 shows the platform part of the tree stand mounted to the tree. 23 is a view of the ladder pinning assembly that makes it possible to assemble the stand without the use of any other tools.

Figure 3:
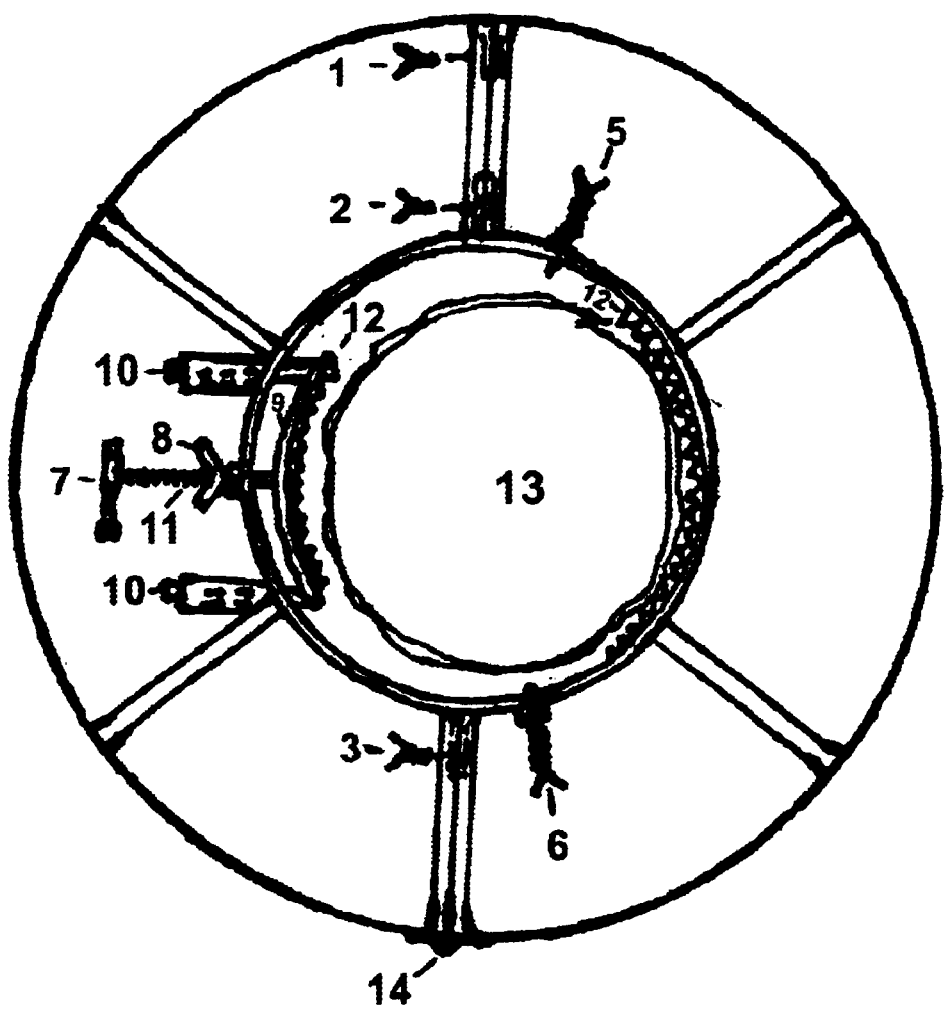
FIG. 3 is a top view as taken from section 3—3 of FIG. 2.

In FIG. 3, with the exception of hinge 14, all other features and functions are the same as in FIG. 1, and therefore the same reference numerals are used.

It is understood that the present invention is not limited to the embodiments described above, but encompasses any and all embodiments within the scope of the claims.

We claim:

1. A tree stand, comprising:

an upper circular seat having a movable ram extending from an inside thereof;

a set of teeth attached to the ram;

a row of teeth opposite the set of teeth, said row of teeth being on the inside of the circular seat;

a set of stabilizer/support bars attached to the set of teeth;

a lower circular platform having a movable ram extending from an inside thereof;

a set of teeth attached to the ram of the lower circular seat;

a row of teeth opposite the set of teeth on the inside of the lower circular platform;

a set of stabilizer/support bars attached to the set of teeth of the lower circular platform.

2. The tree stand described in claim 1, wherein a ladder is attached to the lower circular platform for mounting;

wherein the ladder as mounted and positioned allows for mounting of the tree stand without any additional hardware or tools.

* * * * *